United States Patent
Shin et al.

(10) Patent No.: US 11,777,161 B2
(45) Date of Patent: Oct. 3, 2023

(54) POUCH EXTERIOR MATERIAL FOR LITHIUM SECONDARY BATTERY AND LITHIUM SECONDARY BATTERY INCLUDING SAME

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR); Jeong Woo Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 262 days.

(21) Appl. No.: 16/770,777

(22) PCT Filed: Mar. 8, 2019

(86) PCT No.: PCT/KR2019/002754
§ 371 (c)(1),
(2) Date: Jun. 8, 2020

(87) PCT Pub. No.: WO2019/172721
PCT Pub. Date: Sep. 12, 2019

(65) Prior Publication Data
US 2021/0184299 A1    Jun. 17, 2021

(30) Foreign Application Priority Data

Mar. 9, 2018  (KR) .................. 10-2018-0028145
Mar. 9, 2018  (KR) .................. 10-2018-0028146
Mar. 7, 2019  (KR) .................. 10-2019-0026227

(51) Int. Cl.
| | |
|---|---|
| *H01M 50/129* | (2021.01) |
| *H01M 50/121* | (2021.01) |
| *H01M 50/105* | (2021.01) |
| *H01M 50/119* | (2021.01) |
| *C08G 64/02* | (2006.01) |
| *C08L 23/02* | (2006.01) |
| *C08L 67/02* | (2006.01) |
| *C08L 77/06* | (2006.01) |
| *H01M 10/0525* | (2010.01) |
| *H01M 10/0565* | (2010.01) |

(52) U.S. Cl.
CPC ...... *H01M 50/121* (2021.01); *C08G 64/0208* (2013.01); *C08L 23/02* (2013.01); *C08L 67/02* (2013.01); *C08L 77/06* (2013.01); *H01M 10/0525* (2013.01); *H01M 10/0565* (2013.01); *H01M 50/105* (2021.01); *H01M 50/119* (2021.01); *H01M 50/129* (2021.01); *H01M 2300/0082* (2013.01); *H01M 2300/0085* (2013.01)

(58) Field of Classification Search
CPC ............. H01M 50/129; H01M 50/121; H01M 50/105; H01M 50/119; H01M 10/0525; H01M 10/0565; H01M 2300/0082; H01M 2300/0085; C08G 64/0208; C08L 23/12; C08L 67/02; C08L 77/06
See application file for complete search history.

(56) References Cited

U.S. PATENT DOCUMENTS

| | | | |
|---|---|---|---|
| 6,632,538 B1 * | 10/2003 | Yamazaki | H01M 50/178 429/254 |
| 10,243,239 B1 | 3/2019 | Ahn et al. | |
| 2002/0028388 A1 * | 3/2002 | Lee | H01M 10/0565 429/94 |
| 2004/0029001 A1 * | 2/2004 | Yamazaki | H01M 50/124 429/185 |
| 2009/0214917 A1 | 8/2009 | Tanahashi et al. | |
| 2010/0330433 A1 * | 12/2010 | Amine | H01M 12/06 29/623.5 |
| 2013/0202950 A1 | 8/2013 | Kim et al. | |
| 2015/0147633 A1 * | 5/2015 | Ahn | H01M 50/116 429/176 |
| 2016/0145477 A1 | 5/2016 | Kandori et al. | |
| 2016/0211548 A1 * | 7/2016 | Jin | H01M 10/0525 |
| 2018/0131011 A1 | 5/2018 | Ali et al. | |
| 2018/0312699 A1 | 11/2018 | Akiyama et al. | |
| 2019/0322076 A1 | 10/2019 | He et al. | |

FOREIGN PATENT DOCUMENTS

| | | |
|---|---|---|
| CN | 102569715 A | 7/2012 |
| CN | 106797048 A | 5/2017 |
| CN | 107534183 A | 1/2018 |
| JP | 2005-116322 A | 4/2005 |
| JP | 2010-092703 A | 4/2010 |
| JP | 5226332 B2 | 7/2013 |
| JP | 5268570 B2 | 8/2013 |

(Continued)

OTHER PUBLICATIONS

STIC search results (Year: 2022).*
International Search Report (with partial translation) and Written Opinion issued in corresponding International Patent Application No. PCT/KR2019/002754, dated Jun. 18, 2019.
Extended European Search Report issued from the European Patent Office dated Dec. 21, 2020 in corresponding European patent application No. 19764067.5.

*Primary Examiner* — Victoria H Lynch

(74) *Attorney, Agent, or Firm* — Morgan, Lewis & Bockius LLP

(57) ABSTRACT

The present invention relates to a pouch exterior material which is for a lithium secondary battery and includes an inner layer, an outer resin layer, and a metal layer located between the inner layer and the outer resin layer, wherein the inner layer contains an ethylenically unsaturated group, and a lithium secondary battery including the pouch exterior material.

17 Claims, No Drawings

(56) References Cited

FOREIGN PATENT DOCUMENTS

| | | |
|---|---|---|
| JP | 2017-228478 A | 12/2017 |
| KR | 10-0412091 B1 | 12/2003 |
| KR | 10-2004-0020633 A | 3/2004 |
| KR | 10-2010-0071798 A | 6/2010 |
| KR | 10-2013-0091074 A | 8/2013 |
| KR | 10-2015-0131513 A | 11/2015 |
| KR | 10-2016-0040128 A | 4/2016 |
| WO | 2017/065174 A1 | 4/2017 |

\* cited by examiner

POUCH EXTERIOR MATERIAL FOR LITHIUM SECONDARY BATTERY AND LITHIUM SECONDARY BATTERY INCLUDING SAME

TECHNICAL FIELD

Cross-Reference to Related Applications

This application claims the benefit of Korean Patent Application Nos. 10-2018-0028145, filed on Mar. 9, 2018, 10-2018-0028146, filed on Mar. 9, 2018, and 10-2019-0026227, filed on Mar. 7, 2019, in the Korean Intellectual Property Office, the disclosures of which are incorporated herein in its entirety by reference.

Technical Field

The present invention relates to a pouch exterior material for a lithium secondary battery and a lithium secondary battery including the same, and more particularly, to a pouch exterior material for a lithium secondary battery with improved coupling force with a gel polymer electrolyte and a lithium secondary battery using the same.

Background Art

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

In recent years, due to the growing interest in environmental issues, there have been many studies conducted on electric vehicles (EV) and hybrid electric vehicles (HEV) which can replace vehicles that use fossil fuels, such as gasoline vehicles and diesel vehicles, which are one of the main causes of air pollution.

Such electric vehicles (EV), hybrid electric vehicles (HEV), and the like use, as a power source thereof, a nickel metal hydride (Ni-MH) secondary battery, or a lithium secondary battery of high energy density, high discharge voltage and output stability. When the lithium secondary battery is used in an electric vehicle, significantly superior energy density, safety and long-term life properties to those of a conventional small lithium secondary battery are inevitably required in addition to high energy density and properties capable of producing a large output in a short time, since the battery must be used for more than 10 years under harsh conditions.

Unlike a primary battery which is not typically chargeable, a secondary battery, which is chargeable and dischargeable, has been actively studied due to the development of high-tech fields such as digital cameras, cellular phones, notebook computers, and hybrid cars. Examples of a secondary battery include a nickel-cadmium battery, a nickel-metal hydride battery, a nickel-hydrogen battery, a lithium secondary battery, and the like. Among the above, a lithium secondary battery has an operating voltage of 3.6V or higher and is used as a power source of a portable electronic device, or is used in a hybrid vehicle having high output by connecting several batteries in series. The lithium secondary battery has an operating voltage 3 times higher than that of a nickel-cadmium battery or a nickel-metal hydride battery, and has excellent energy density properties per unit weight, so that the use thereof is rapidly increasing.

Meanwhile, the lithium secondary battery may be generally classified into a lithium metal secondary battery and a lithium ion secondary battery, and the lithium ion secondary battery may use a liquid electrolyte, a polymer electrolyte (gel type, solid type), an ionic liquid electrolyte, and the like, as an electrolyte. In general, when a liquid electrolyte or a gel polymer electrolyte is used, the liquid electrolyte or the gel polymer electrolyte is usually used in the form of being welded and sealed having a cylindrical or rectangular metal can as a container. A battery using such a metal can as a container has a fixed shape, and thus, has a disadvantage of limiting the design of electrical appliances which use the battery as a power source and has difficulty in reducing the volume. Accordingly, a pouch-type secondary battery in which an electrode assembly composed of both electrodes, a separator, and the like and an electrolyte are put into and sealed in a pouch is used. A typically-used pouch exterior material for a secondary battery has a multi-layered film structure in which an internal resin layer having thermal adhesion, thereby serving as a sealing material, a metal thin film serving as a barrier layer of moisture and oxygen while maintaining mechanical strength, and an outer resin layer acting as a substrate and a protection layer are sequentially laminated. Such a pouch-type secondary battery may be manufactured in various forms, and has an advantage of implementing the same capacity with a smaller volume and mass.

However, a conventional pouch-type battery has a problem in that an internal short circuit occurs in a battery due to an external impact, and when gas is generated inside the battery due to an oxidation decomposition reaction of an electrolyte under the condition of high temperatures, the gas is not controlled, thereby having low high-temperature safety and storage properties. Accordingly, there has been a demand for improvement.

(Patent Document 1) Korean Patent Laid-Open Publication No. 10-2015-0131513.

DISCLOSURE OF THE INVENTION

Technical Problem

An aspect of the present invention provides a pouch exterior material for a lithium secondary battery capable of improving adhesion with a gel polymer electrolyte, thereby improving mechanical performance, high-temperature storage, and high-temperature safety inside a battery, and a lithium secondary battery including the same.

Technical Solution

According to an aspect of the present invention, there is provided a pouch exterior material for a lithium secondary battery including an inner layer, an outer resin layer, and a metal layer located between the inner layer and the outer resin layer, wherein the inner layer contains an ethylenically unsaturated group.

For example, the inner layer may include a first layer containing a resin, and the resin may include an ethylenically unsaturated group.

In another example, the inner layer may include a first layer containing a resin and a second layer formed on the first layer, and the second layer may include an inorganic oxide containing an ethylenically unsaturated group.

At this time, the ethylenically unsaturated group may be one or more selected from the group consisting of a vinyl group, an acryloxy group and a methacryloxy group.

According to another aspect of the present invention, there is provided a lithium secondary battery comprising an electrode assembly, a gel polymer electrolyte including a polymer network in which an oligomer containing a (meth) acrylate group and an oxyalkylene group are coupled in a three-dimensional structure, and a pouch exterior material for a lithium secondary battery receiving the electrode assembly and the gel polymer electrolyte and including an inner layer containing an ethylenically unsaturated group, wherein the ethylenically unsaturated group and the oligomer are coupled.

Advantageous Effects

An inner layer included in a pouch exterior material for a lithium secondary battery according to the present invention contains an ethylenically unsaturated group so that while an oligomer included in a gel polymer electrolyte composition is being cured through a radical polymerization reaction, the ethylenically unsaturated group may participate in the polymerization reaction and coupled to the oligomer.

When the oligomer and the inner layer are coupled, the adhesion between the pouch exterior material and the gel polymer electrolyte is improved, so that the mechanical performance and the storage properties of a battery may be improved.

BEST MODE FOR CARRYING OUT THE INVENTION

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Meanwhile, unless otherwise specified in the present invention, "*" refers to a portion connected between ends of the same or different atoms or chemical formulas.

<Pouch Exterior Material for Lithium Secondary Battery>

A pouch exterior material for a lithium secondary battery according to the present invention includes an inner layer, an outer resin layer, and a metal layer located between the inner layer and the outer resin layer.

A lithium secondary battery using a typical liquid electrolyte or gel polymer electrolyte and the like was used by placing an electrode assembly and an electrolyte into a cylindrical or rectangular metal can, following by welding and sealing. Meanwhile, a rectangular lithium secondary battery is advantageous in terms of protecting an electrode assembly from an external impact and has an easy liquid injection process. However, the shape of the rectangular lithium secondary battery is limited and the volume thereof is difficult to reduce. In addition, in terms of safety, since the process of exporting gas or liquid (vent process) is not smoothly performed, internal heat and gas are accumulated so that there is a great risk of explosion due to overheating, and there is a disadvantage in that battery performance is rapidly deteriorated.

In order to overcome the disadvantages, in recent years, a pouch-type secondary battery has been developed which is manufactured by placing an electrode assembly in which a positive electrode, a negative electrode, and a separator are laminated and wound in a pouch exterior material, followed by sealing and then injecting a liquid electrolyte, or injecting a gel polymer electrolyte composition, and then curing the mixture.

Meanwhile, a conventional pouch exterior material have problems in that the pouch exterior material is not capable of mitigating an external impact applied to a lithium secondary battery, thereby causing the deterioration in mechanical performance such as the occurrence of an internal short circuit in a battery, and not capable of suppressing a battery swelling phenomenon occurring due to heat generation or ignition inside the battery, so that high-temperature storage and high-temperature safety properties are low.

In order to solve the above problems, the present invention includes, in an inner layer of a pouch exterior material, an ethylenically unsaturated group capable of radical polymerization with an oligomer constituting a gel polymer electrolyte composition such that when the gel polymer electrolyte composition is cured, not only oligomers are coupled to each other but also the ethylenically unsaturated group is coupled to an oligomer.

When the pouch exterior material for a lithium secondary battery is used, the adhesion between a gel polymer electrolyte and a pouch exterior material is excellent, so that the durability and mechanical stiffness of a lithium secondary battery are improved, thereby preventing a short circuit in the battery due to an external impact. In addition, even when gas is generated in the lithium secondary battery due to an oxidation decomposition reaction of an electrolyte under the condition of high temperatures, it is possible to suppress a swelling phenomenon of the battery, thereby improving high-temperature safety and high-temperature storage properties.

The inner layer has thermal adhesion, thereby serving as a sealing material, and may be formed of at least one layer. For example, the inner layer may be formed of a single-layered structure including only a resin layer, or may be formed of a multi-layered structure further including a separate layer in addition to the resin layer. More specifically, the inner layer may include a first layer containing a resin, and the resin may include an ethylenically unsaturated group.

In another example, the inner layer may include a first layer containing a resin and a second layer formed on the first layer, and the second layer may include an inorganic oxide containing an ethylenically unsaturated group.

First, when forming an inner layer with a resin including an ethylenically unsaturated group, an ethylenically unsaturated group may be included in the resin by using a polymer including the ethylenically unsaturated group. Alternatively, an inner layer may be formed by further coating a polymer including an ethylenically unsaturated group on a resin layer which is formed of a polymer.

Specifically, as the polymer resin used for forming the inner layer, one or more polymers selected from the group consisting of a polypropylene-butylene-ethylene terpolymer, polypropylene, polyethylene, an ethylene propylene copolymer, a copolymer of polyethylene and acrylic acid, and a copolymer of polypropylene and acrylic acid may be used.

A polymer resin including an ethylenically unsaturated group is one in which the main chain and/or a side chain of the polymers listed above is substituted with the ethylenically unsaturated group, and the ethylenically unsaturated group may include at least one selected from the group consisting of a vinyl group, an acryloxy group and a methacryloxy group.

Next, when the inner layer includes a first layer including a resin and a second layer formed on the first layer, wherein the second layer includes an inorganic oxide containing an ethylenically unsaturated group, the inorganic oxide substituted with the ethylenically unsaturated group is coated on one surface of the inner layer facing a gel polymer electrolyte, so that when a gel polymer electrolyte composition is cured, an oligomer and the ethylenically unsaturated group may be coupled together to improve the adhesion with a pouch exterior material.

In addition, since the coating layer includes an inorganic oxide, the mechanical impact from the outside of a battery may be further mitigated while maintaining the thickness of a conventional pouch exterior material, and the high-temperature safety and storage properties may be further improved.

For example, the inorganic oxide may be an oxide including at least one element selected from the group consisting of Si, Al, Ti, Zr, Sn, Ce, Mg, Ca, Zn, Y, Pb, Ba, Hf, and Sr, and preferably, may be an oxide including at least one element selected from the group consisting of Si, Al, Ti, and Zr.

Meanwhile, the inorganic oxide may be an inorganic oxide coupling agent in which an oxide of the elements listed above is substituted with an ethylenically unsaturated group, and the ethylenically unsaturated group may be at least one selected from the group consisting of a vinyl group, an acryloxy group and a methacryloxy group.

More specifically, when the inorganic oxide coupling agent substituted with the ethylenically unsaturated group is coated on the surface of a first layer including a resin, the polymer resin-inorganic oxide-ethylenically unsaturated group are coupled in order to form a second layer. At this time, an inorganic oxide included in the inorganic oxide coupling agent may include $SiO_2$, $Al_2O_3$, $TiO_2$, $ZrO_2$, $SnO_2$, $CeO_2$, MgO, CaO, ZnO, $Y_2O_3$, $Pb(Zr,Ti)O_3$ (PZT), $Pb_{(1-a1)}La_{a1}Zr_{(1-b1)}Ti_{b1}O_3$ (0≤a1≤1, ≤0≤b1≤1, PLZT), $PB(Mg_3Nb_{2/3})O_3$—$PbTiO_3$ (PMN-PT), $BaTiO_3$, $HfO_2$(hafnia), $SrTiO_3$, and the like, and the inorganic oxides listed above are characterized in that the physical properties thereof do not change even at a high temperature of 200° C. or higher. More preferably, the inorganic oxide may include at least one selected from the group consisting of $SiO_2$, $Al_2O_3$, $TiO_2$, and $ZrO_2$.

Specifically, the inorganic oxide substituted with the ethylenically unsaturated group is an alkoxysilane compound substituted with an ethylenically unsaturated group, and may be 3-methacryloxypropyltrimethoxysilane, vinyltriethoxysilane, and the like, but is not limited to the compounds listed above.

Meanwhile, the thickness of the inner layer may be 0.1 μm to 100 μm, preferably 0.5 μm to 100 μm, more preferably 1 μm to 100 μm. When the thickness of the entire inner layer is within the above range, the mechanical properties of a pouch exterior material are improved, so that the shape thereof is constantly maintained and the leakage of an electrolyte may be suppressed.

Meanwhile, when the inner layer includes a first layer including a resin and a second layer including an inorganic oxide containing an ethylenically unsaturated group formed on the first layer, the thickness of the second layer may be 0.01 μm to 10 μm, preferably 0.05 μm to 7 μm, more preferably 0.1 μm to 5 μm. When the thickness of the second layer in formed to be within the above range, the durability of a pouch exterior material and the adhesion to an electrolyte are excellent, the manufacturing process is economical, and the energy density per volume of a battery may be maintained above a predetermined level.

The outer resin layer is a protection layer for mitigating an external impact, and may be formed of at least one layer.

Specifically, the outer resin layer may include a single layer of one or a composite layer of two or more selected from the group consisting of a polyethylene resin, a polypropylene resin, a polyethylene terephthalate resin, nylon, a low-density polyethylene (LDPE) resin, a high-density polyethylene (HDPE) resin, and a linear low-density polyethylene (LLDPE) resin.

At this time, the thickness of the outer resin layer may be 0.1 μm to 50 μm, preferably 0.5 μm to 50 μm, more preferably 1 μm to 50 μm. When the thickness of the outer resin layer is within the above range, the mechanical properties of a pouch exterior material may be maintained above a predetermined level and the leakage of an electrolyte may be prevented.

The metal layer is located between the inner layer and the outer resin layer serving as a barrier layer of moisture and oxygen while maintaining the strength of a lithium secondary battery above a predetermined level, and may be formed of at least one layer.

Specifically, the metal layer may include any one or more selected from the group consisting of an alloy of iron (Fe), carbon (C), chromium (Cr) and manganese (Mn), an alloy of iron (Fe), carbon (C), chromium (Cr) and nickel (Ni), and aluminum (Al).

At this time, the thickness of the metal layer may be 0.1 μm to 50 μm, preferably 0.5 μm to 50 μm, more preferably 1 μm to 50 μm. When the thickness of the metal layer is within the above range, the mechanical properties of a pouch exterior material may be maintained above a predetermined level and the leakage of an electrolyte may be prevented.

<Lithium Secondary Battery>

Next, a lithium secondary battery according to the present invention will be described. The lithium secondary battery according to another embodiment of the present invention includes an electrode assembly, a gel polymer electrolyte, and a pouch exterior material for a lithium secondary battery receiving the electrode assembly and the gel polymer electrolyte and including an inner layer containing an ethylenically unsaturated group, wherein the ethylenically unsaturated group and the oligomer are coupled. The description of the pouch exterior material for a lithium secondary battery is the same as that described above, and thus, detailed description thereof will be omitted.

The electrode assembly is provided by laminating a negative electrode including a negative electrode active material and a positive electrode including a positive electrode active material with a separator interposed therebetween.

Specifically, the positive electrode may be prepared by coating a positive electrode active material slurry including a positive electrode active material, a binder, a conductive material, and a solvent on a positive electrode current collector.

The positive electrode current collector typically has a thickness of 3 μm to 500 μm, and is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein $0<Y2<1$), $LiMn_{2-Z1}Ni_{Z1}O_4$ (wherein $0<Z1<2$), etc.), a lithium-nickel-cobalt-based oxide (e.g., $LiNi_{1-Y2}Co_{Y2}O_2$ (wherein $0<Y2<1$), etc.), a lithium-manganese-cobalt-based oxide (e.g., $LiCo_{1-Y3}Mn_{Y3}O_2$ (wherein $0<Y3<1$), $LiMn_{2-Z2}Co_{Z2}O_4$ (wherein $0<Z2<2$), etc.), a lithium-nickel-manganese-cobalt-based oxide (e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}Co_{q2}Mn_{r2})O_4$ (wherein $0<p2<2$, $0<q2<2$, $0<r2<2$, $p2+q2+r2=2$), etc.), or a lithium-nickel-cobalt-transition metal (M) oxide (e.g., $Li(Ni_{p3}Co_{q3}Mn_{r3}M_{s1})O_2$ (wherein M is selected from the group consisting of Al, Fe, V, Cr, Ti, Ta, Mg, and Mo, and p3, q3, r3, and s1 are each an atomic fraction of independent elements, wherein $0<p3<1$, $0<q3<1$, $<r3<1$, $0<s1<1$, $p3+q3+r3+s1=1$) and the like, and any one thereof or a compound of two or more thereof may be included.

Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}CO_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel cobalt aluminum oxide (e.g., $LiNi_{0.8}Co_{0.15}Al_{0.05}O_2$, etc.), and the like. When considering a remarkable improvement effect according to the control of type and content ratio of constituent elements forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}CO_{0.1})O_2$, and the like, and any one thereof or a mixture of two or more thereof may be used.

The positive electrode active material may be included in an amount of 60 wt % to 98 wt %, preferably 70 wt % to 98 wt %, more preferably 80 wt % to 98 wt % based on the total weight of a solid excluding the solvent from the positive electrode active material slurry.

The binder is a component for assisting in coupling between an active material and a conductive material, and coupling to a current collector. Specifically, examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene monomer (EPDM), a sulfonated EPDM, styrene-butadiene rubber, nitrile-butadiene rubber, fluorine rubber, various copolymers thereof, and the like. Typically, the binder may be included in an amount of 1 wt % to 20 wt %, preferably 1 wt % to 15 wt %, more preferably 1 wt % to 10 wt % based on the total weight of a solid excluding the solvent from the positive electrode active material slurry.

The conductive material is a component for further improving the conductivity of a positive electrode active material. The conductive material is not particularly limited as long as it has conductivity without causing a chemical change in the battery. Examples of the conductive material may include graphite; a carbon-based material such as carbon black, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series (products of Chevron Chemical Company), Denka black (product of Denka Singapore Private Limited, Gulf Oil Company, etc.), Ketjen black, EC series (product of Armak Company), Vulcan XC-72 (product of Cabot Company), and Super P (product of Timcal company). The conductive material may be included in an amount of 1 wt % to 20 wt %, preferably 1 wt % to 15 wt %, more preferably 1 wt % to 10 wt % based on the total weight of a solid excluding the solvent from the positive electrode active material slurry.

The solvent may include an organic solvent such as N-methyl-2-pyrrolidone (NMP), and may be used in an amount such that a preferred viscosity is achieved when the positive electrode active material, and selectively, the binder and the conductive material, and the like are included. For example, the solvent may be included in an amount such that the concentration of a solid including the positive electrode active material, and selectively the binder and the conductive material is 50 wt % to 95 wt %, preferably 70 wt % to 95 wt %, more preferably 70 wt % to 90 wt %.

Also, the negative electrode may be prepared by coating a negative electrode active material slurry including a negative electrode active material, a binder, a conductive material, and a solvent on a negative electrode current collector.

The negative electrode current collector typically has a thickness of 3 μm to 500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

Examples of the negative electrode active material may include one or two or more kinds of negative active materials selected from the group consisting of natural graphite, artificial graphite, a carbonaceous material; a metal (Me) such as a lithium-containing titanium composite oxide (LTO), Si, Sn, Li, Zn, Mg, Cd, Ce, Ni or Fe; an alloy composed of the metals (Me); an oxide (MeOx) of the metal (Me); and a composite of the metal (Me) and carbon.

The negative electrode active material may be included in an amount of 60 wt % to 98 wt %, preferably 70 wt % to 98 wt %, more preferably 80 wt % to 98 wt % based on the total weight of a solid excluding the solvent from the negative electrode active material slurry.

The descriptions of the binder, conductive material, and solvent are the same as those described above, and thus, detailed descriptions thereof will be omitted.

As a separator for insulating the electrodes between the positive electrode and the negative electrode, a polyolefin-based separator, which is typically known, or a composite separator having an organic-inorganic composite layer formed on an olefin-based substrate may be all used, but the embodiment of the present invention is not particularly limited thereto.

The electrode assembly is received in a pouch exterior material for a lithium secondary battery and a gel polymer electrolyte composition is injected thereto to manufacturer a lithium secondary battery.

The gel polymer electrolyte is formed by injecting the gel polymer electrolyte composition into a battery pouch exterior material and then performing a polymerization reaction, and includes a polymer network in which an oligomer containing a (meth)acrylate group and an oxyalkylene group are coupled in a three-dimensional structure. The oligomer including the (meth)acrylate group may be coupled in a three-dimensional structure by having a radical polymerization reaction with an inorganic oxide substituted with the ethylenically unsaturated group as well as between oligomers.

For example, the oligomer may be represented by Formula 1 below.

   [Formula 1]

In Formula 1, A and A' are each independently a unit containing a (meth)acrylate group, and $C_1$ is a unit containing an oxyalkylene group.

Specifically, the units A and A' are units including a (meth)acrylate group such that an oligomer may be coupled in a three-dimensional structure so as to form a polymer network. The units A and A' may be derived from a monomer including monofunctional or polyfunctional (meth)acrylate or (meth)acrylic acid.

For example, the units A and A' may each independently contain at least one of the units represented by Formula A-1 to Formula A-5 below.

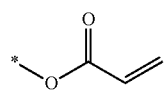   [Formula A-1]

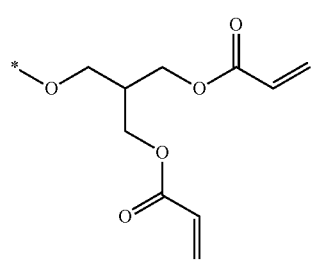   [Formula A-2]

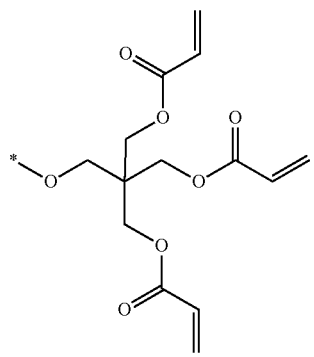   [Formula A-3]

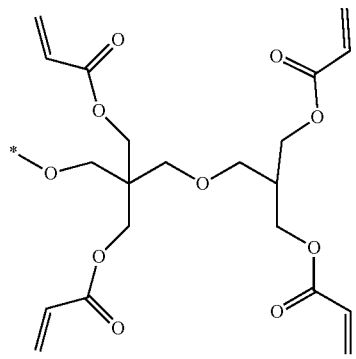   [Formula A-4]

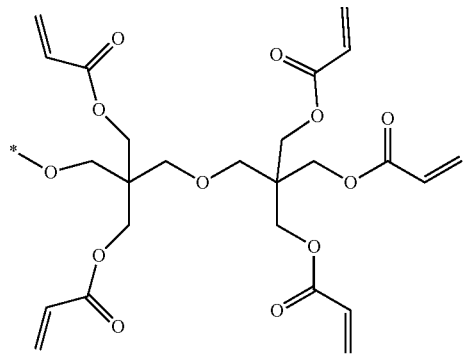   [Formula A-5]

The unit $C_1$ may include a unit represented by Formula $C_1$-1.

   [Formula $C_1$-1]

In Formula $C_1$-1, R is a substituted or unsubstituted linear-type or branched-type alkylene group having 1 to 10 carbon atoms, and k1 is an integer of 1 to 30.

In another example, in Formula $C_1$-1, R may be —$CH_2CH_2$— or —$CHCH_3CH_2$—.

For example, according to one embodiment of the present invention, an oligomer forming a polymer network may be at least one compound selected from the group consisting of consisting of Formula 1-1 to Formula 1-5 below.

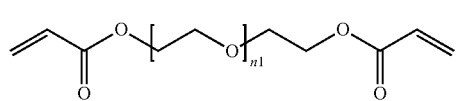
[Formula 1-1]
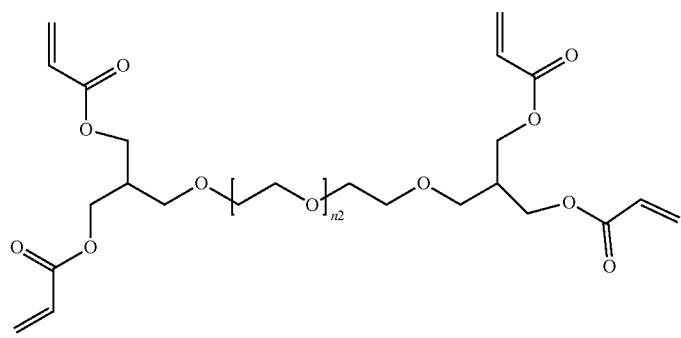
[Formula 1-2]
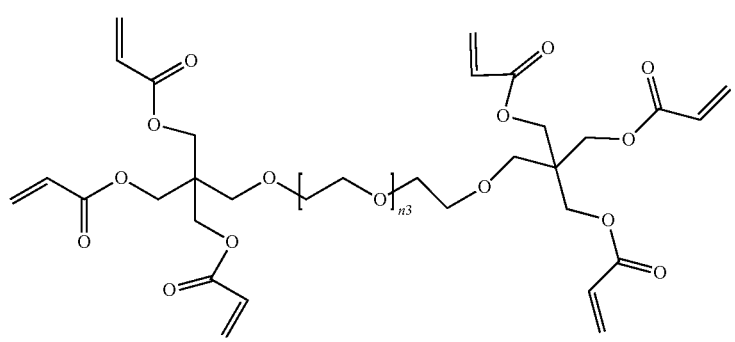
[Formula 1-3]
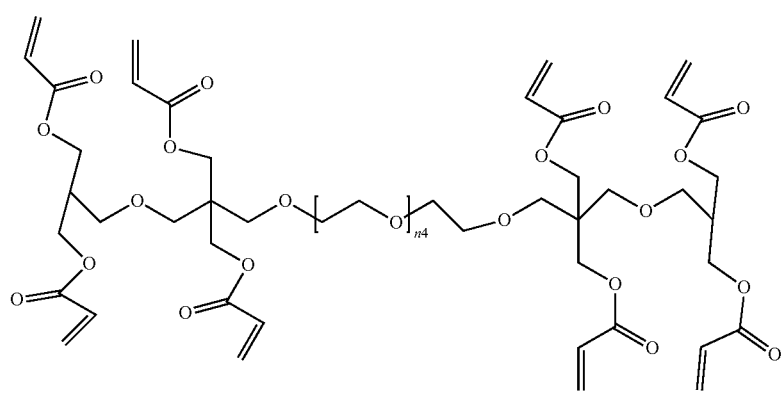
[Formula 1-4]
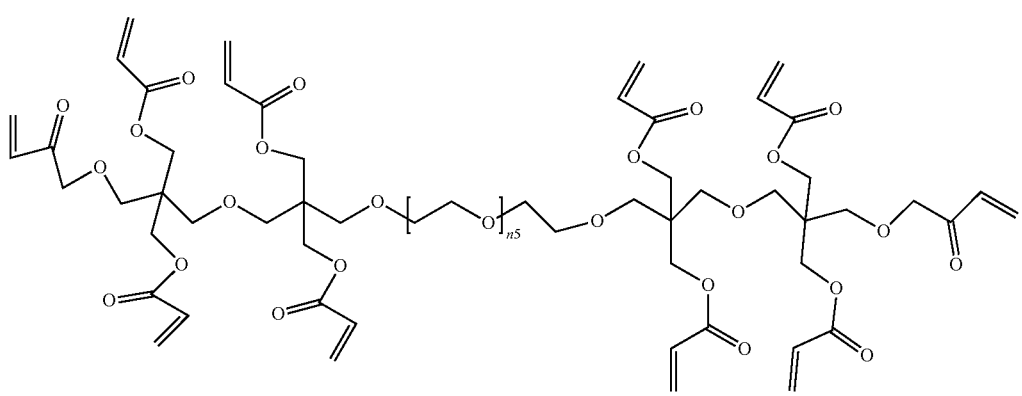
[Formula 1-5]

In Formula 1-1 to Formula 1-5, n1 to n5 are each independently an integer of 1 to 20,000, preferably an integer of 1 to 10,000, and more preferably an integer of 1 to 5,000.

In another example, the oligomer may be represented by Formula 2 below.

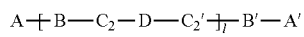

[Formula 2]

In Formula 2, A and A' are each independently a unit containing a (meth)acrylate group, which are the same as described above, B and B' are each independently a unit containing an amide group, $C_2$ and $C_2'$ are each independently a unit containing an oxyalkylene group, D is a unit containing a siloxane group, and l is an integer of 1 to 200.

Meanwhile, l may be preferably an integer of 10 to 200, more preferably 20 to 200. When l is in the above range, while the mechanical properties of a polymer formed by the oligomer are high, the fluidity thereof is maintained above a predetermined level, so that the polymer may be uniformly dispersed inside a battery.

In addition, B and B' are each independently a unit containing an amide group, which control ion transfer properties and impart mechanical properties in implementing a polymer electrolyte.

For example, B and B' may each independently include a unit represented by Formula B-1 below.

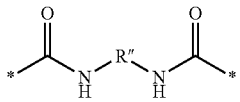

[Formula B-1]

In Formula B-1, R″ is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a unit represented by Formula R″-1 below, and a unit represented by Formula R″-2 below

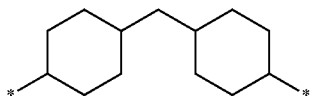

[Formula R″-1]

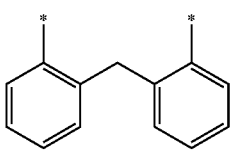

[Formula R″-2]

In another example, in Formula B-1, R″ may include at least one of the units represented by Formulas R″-3 to R″-8 below.

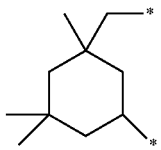

[Formula R″-3]

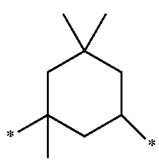

[Formula R″-4]

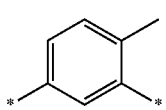

[Formula R″-5]

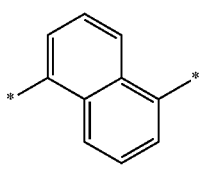

[Formula R″-6]

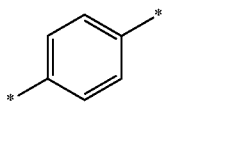

[Formula R″-7]

[Formula R″-8]

Also, in implementing the polymer electrolyte of the present invention, the units $C_2$ and $C_2'$ are each independently a unit containing an oxyalkylene group. The units C2 and C2' are used to control the dissociation and ion transport capacity of the salt in the polymer network.

For example, C2 and C2' may each independently include a unit represented by Formula $C_2$-1 below.

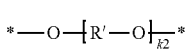

[Formula $C_2$-1]

In Formula $C_2$-1, R' is a substituted or unsubstituted linear-type or branched-type alkylene group having 1 to 10 carbon atoms, and k2 is an integer of 1 to 30.

In another example, in Formula $C_2$-1, R' may be —$CH_2CH_2$— or —$CHCH_3CH_2$—.

Also, the unit D contains a siloxane group and is to control mechanical properties and the affinity with the separator. Specifically, a structure for securing the flexibility in a region other than the region of a rigid structure due to an amide bond may be formed in the polymer network.

For example, the unit D may include a unit represented by Formula D-1.

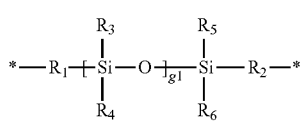
[Formula D-1]

In Formula D-1, $R_1$ and $R_2$ are linear or non-linear alkylene groups having 1 to 5 carbon atoms, $R_3$, $R_4$, $R_5$, and $R_6$ are each independently hydrogen, an alkyl group having 1 to 5 carbon atoms, or an aryl group having 6 to 12 carbon atoms, and g1 is an integer of 1 to 400. Meanwhile, g1 may be preferably an integer of 1 to 300, more preferably 1 to 200.

In another example, the unit D may include a unit represented by Formula D-2 below.

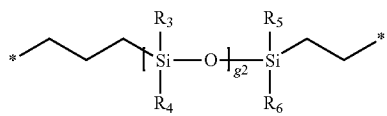
[Formula D-2]

In Formula D-2, $R_3$, $R_4$, $R_5$, and $R_6$ are each independently hydrogen, an alkyl group having 1 to 5 carbon atoms, or an aryl group having 6 to 12 carbon atoms, and g2 may be an integer of 1 to 400, preferably an integer of 1 to 300, more preferably an integer of 1 to 200.

More specifically, D-1 may be at least one selected from the units represented by Formulas D-3 and D-4 below.

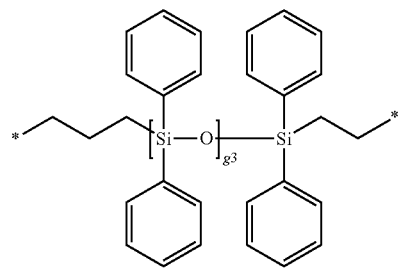
[Formula D-3]

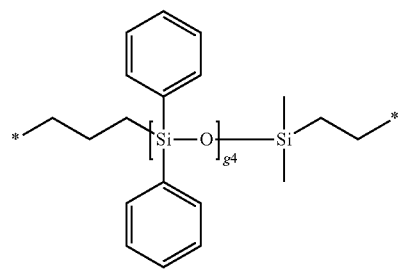
[Formula D-4]

In Formulas D-3 and D-4, g3 and g4 may be each independently an integer of 1 to 400, preferably an integer of 1 to 300, and more preferably an integer of 1 to 200.

For example, according to one embodiment of the present invention, the oligomer forming a polymer network may be at least one compound selected from the group consisting of the compounds represented by Formulas 2-1 to 2-5 below.

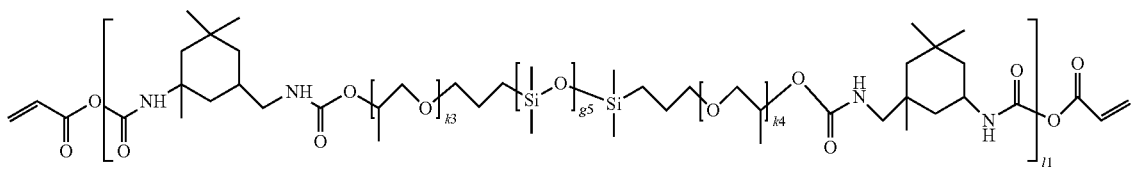
[Formula 2-1]

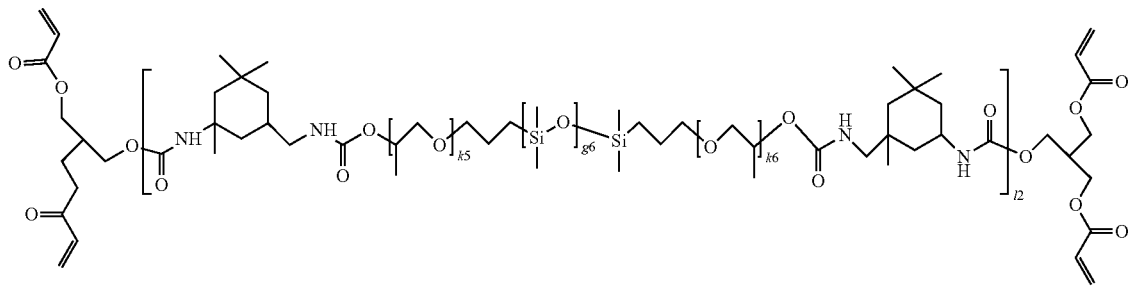
[Formula 2-2]

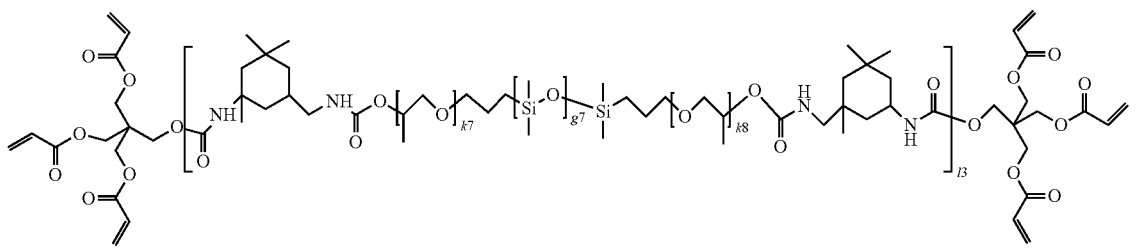
[Formula 2-3]

[Formula 2-4]

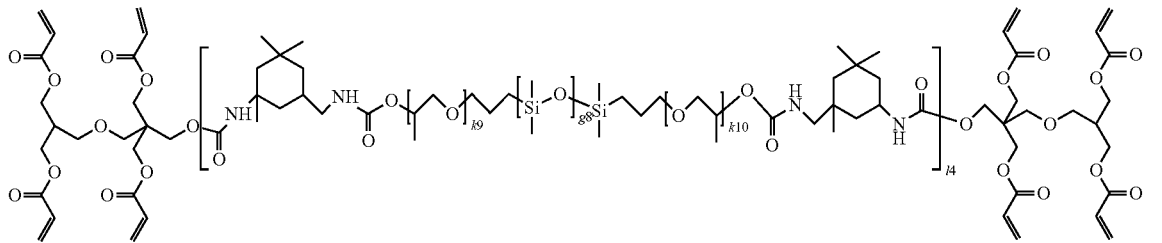

[Formula 2-5]

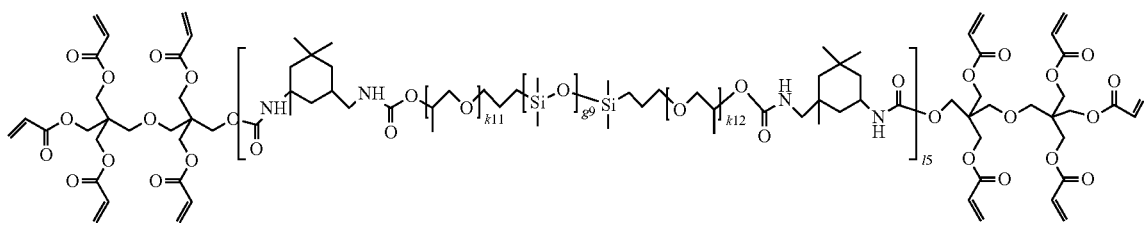

Meanwhile, in Formulas 2-1 to 2-5, k3 to k12 are each independently an integer of 1 to 30, g5 to g8 are each independently an integer of 1 to 400, and l1 to l5 are each independently an integer of 1 to 200.

Meanwhile, l1 to l5 may be, preferably, each independently an integer of 1 to 150. When l1 to l5 are in the above range, while the mechanical properties of a polymer formed by the oligomer are high, the fluidity thereof is maintained above a predetermined level, so that the polymer may be uniformly dispersed inside a battery.

Also, the oligomer of the present invention may have a weight average molecular weight of about 1,000 g/mol to about 100,000 g/mol. When the weight average molecular weight of the oligomer is in the above range, the mechanical strength of a battery including the same may be effectively improved.

Meanwhile, the gel polymer electrolyte is preferably formed by injecting a gel polymer electrolyte composition including the oligomer into a pouch exterior material and then curing the composition.

More specifically, a secondary battery according to the present invention may be manufactured by (a) inserting an electrode assembly composed of a positive electrode, a negative electrode, and a separator interposed between the positive electrode and the negative electrode into a battery pouch exterior material, and (b) injecting into the battery pouch exterior material the composition for gel polymer electrolyte according to the present invention, followed by polymerizing to form a gel polymer electrolyte.

At this time, the polymerization reaction may be performed, for example, by E-BEAM, gamma ray and/or room temperature/high-temperature aging (thermal polymerization) process.

Meanwhile, the composition for gel polymer electrolyte may include a lithium salt, a non-aqueous organic solvent, and a polymerization initiator in addition to the oligomer.

Any lithium salt may be used without particular limitation as long as it is typically used in an electrolyte for a lithium secondary battery. For example, the lithium salt may include $Li^+$ as positive ions, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as negative ions. The lithium salt may include a single material or a mixture of two or more materials, when needed. The lithium salt may typically be included in a composition for gel polymer electrolyte at a concentration of 0.8 M to 2 M, specifically 0.8 M to 1.5 M. However, the concentration of the lithium salt is not limited to the above range, and the lithium salt may be included at a high concentration of 2 M or higher depending on other components in the composition for a gel polymer electrolyte.

Any non-aqueous organic solvents typically used in an electrolyte for lithium secondary battery may be used without limitation as the non-aqueous organic solvent. For example, an ether compound, an ester compound, an amide compound, a linear carbonate compound, or a cyclic carbonate compound may be used alone or in combination of two or more thereof. Among the above, typical examples may include a cyclic carbonate compound, a linear carbonate compound, or a mixture thereof.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may include any one selected from the group consisting of dimethyl carbonate (DMC), diethyl carbonate (DEC), dipropyl carbonate, ethyl methyl carbonate (EMC), methyl propyl carbonate, and ethyl propyl carbonate, or a mixture of two or more thereof, but are not limited thereto.

Specifically, among the carbonate-based organic solvents, a cyclic carbonate such as ethylene carbonate and propylene carbonate which are organic solvents having high viscosity and high dielectric constant, thereby dissociating a lithium salt in an electrolyte well, may be used. When a linear carbonate such as dimethyl carbonate and diethyl carbonate having low viscosity and low dielectric constant is mixed with such cyclic carbonate in an appropriate ratio and used, an electrolyte having high electrical conductivity may be prepared.

Also, among the non-aqueous organic solvents, the ether compound may be any one selected from the group consisting of dimethyl ether, diethyl ether, dipropyl ether, methyl ethyl ether, methyl propyl ether, and ethyl propyl ether, or a mixture of two or more thereof, but is not limited thereto.

Also, among the non-aqueous organic solvents, the ester compound may be any one selected from the group consisting linear esters such as methyl acetate, ethyl acetate, propyl acetate, methyl propionate, ethyl propionate, propyl propionate, and butyl propionate; and cyclic esters such as γ-butyrolactone, γ-valerolactone, γ-caprolactone, σ-valerolactone, and ε-caprolactone, or a mixture of two or more thereof, but is not limited thereto.

The polymerization initiator is a compound which is decomposed by heat, a non-limiting example thereof may be 30° C. to 100° C., specifically 60° C. to 80° C., in a battery, or decomposed at room temperature (5° C. to 30° C.) to form a radical. At this time, the formed radical may initiate a free radical reaction with a functional group such as a (meth) acrylate group in the oligomer to form a polymer network through the polymerization reaction between the oligomers. As the polymer network is formed, curing by bonding between the oligomers may proceed to form a gel polymer electrolyte.

The polymerization initiator may be any typical polymerization initiator known in the art, and may be at least one selected from the group consisting of an azo-based compound, a peroxide-based compound, or a mixture thereof.

For example, the polymerization initiator may be an organic peroxide or a hydroperoxide such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo compound selected from the group consisting of 2,2'-azobis (2-cyanobutane), dimethyl 2,2'-azobis (2-methylpropionate), 2,2'-azobis (methylbutyronitrile), 2,2'-azobis (isobutyronitrile) (AIBN), and 2,2'-azobisdimethyl-valeronitrile (AMVN), but is not limited thereto.

The polymerization initiator may be included in an amount of 0.1 wt % to 5 wt % based on the total weight of the oligomer. When the polymerization initiator is included in the above range, the remaining amount of unreacted polymerization initiator may be minimized, and the gelation may be performed above a predetermined level.

According to another embodiment of the present invention, a battery module including the lithium secondary battery as a unit cell and a battery pack including the same are provided. The battery module and the battery pack include the lithium secondary battery having high capacity, high rate properties, and cycle properties, and thus may be used as a power source of a medium-and-large sized device selected from the group consisting of an electric vehicle, a hybrid electric vehicle, a plug-in hybrid electric vehicle, and a power storage system.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

1. Example 1

(1) Preparation of Pouch Exterior Material for Lithium Secondary Battery

A polypropylene resin and a polyester resin (PET) were melted, and at about 220° C., the polypropylene resin and the polyester resin were mixed and spun at a weight ratio of 6:4 to prepare a porous non-woven fabric support having a thickness of 80 μm.

Thereafter, the polypropylene resin was melted, and then using a T-die (doctor blade) method, the polypropylene resin was charged into inner pores of the non-woven support to prepare a polypropylene resin layer having an overall thickness of about 80 μm.

On one surface of an aluminum thin film (40 μm), the polypropylene resin layer was bonded, and then on the other surface of the aluminum thin film, a PET/nylon layer (outer resin layer, 40 μm) was bonded.

Thereafter, a polypropylene resin including a vinyl group was melted, and the melted polypropylene resin including a vinyl group was applied on the other surface of the polypropylene resin layer and pressed to form an inner layer including the vinyl group, thereby manufacturing a pouch exterior material for a lithium secondary battery.

(2) Manufacturing of Electrode Assembly (1) Preparation of Pre-Lithiation Solution 94 wt % of $Li(Ni_{0.8}Mn_{0.1}Co_{0.1})O_2$ as a positive electrode active material, 3 wt % of carbon black as a conductive material, and 3 wt % of polyvinylidene fluoride (PVDF) as a binder were added to N-methyl-2-pyrrolidone(NMP) which is a solvent to prepare a positive electrode mixture slurry. The positive electrode mixture slurry was applied to an aluminum (Al) thin film having a thickness of about 20 μm, which is a positive electrode current collector, dried and then roll pressed to manufacture a positive electrode.

96 wt % of carbon powder as a negative electrode active material, 3 wt % of PVDF as a binder, and 1 wt % of carbon black as a conductive material were added to NMP which is a solvent to prepare a negative electrode mixture slurry. The negative electrode mixture slurry was applied to a copper (Cu) thin film having a thickness of about 10 μm, which is a negative electrode current collector, dried and then roll pressed to manufacture a negative electrode.

The positive electrode, the negative electrode, and a separator composed of three layers of polypropylene/polyethylene/polypropylene (PP/PE/PP) were sequentially laminated to manufacture an electrode assembly.

(3) Preparation of Gel Polymer Electrolyte 94.99 g of an organic solvent in which 1 M of $LiPF_6$ is dissolved in ethylene carbonate (EC):ethyl methyl carbonate (EMC)=3:7 (volume ratio) was added with 5 g of a compound (n1=3) represented by Formula 1-1 and 0.01 g of dimethyl 2,2'-azobis (2-methylpropionate) (CAS No. 2589-57-3), which is a polymerization initiator, to prepare a gel polymer electrolyte composition.

(4) Manufacturing of Lithium Secondary Battery

The electrode assembly was received in a pouch manufactured with the pouch exterior material for a lithium secondary battery, and then the gel polymer electrolyte composition was injected thereto and heated for 5 hours at 65° C. to manufacture a lithium secondary battery including a thermally polymerized gel polymer electrolyte.

2. Example 2

A pouch exterior material for a lithium secondary battery and a lithium secondary battery were prepared in the same manner as in Example 1, except that, when forming the inner layer, polypropylene including an acryloxy group was used instead of polypropylene including a vinyl group.

3. Example 3

A polypropylene resin and a polyester resin (PET) were melted, and at about 220° C., the polypropylene resin and the polyester resin were mixed and spun at a weight ratio of 6:4 to prepare a porous non-woven fabric support having a thickness of 80 μm.

Next, the polypropylene resin was melted, and then using a T-die (doctor blade) method, the polypropylene resin was charged into inner pores of the non-woven support to prepare a polypropylene resin layer having an overall thickness of about 80 μm.

On one surface of an aluminum thin film (40 μm), the polypropylene resin layer was bonded, and then on the other surface of the aluminum thin film, a PET/nylon layer which is an outer resin layer (40 μm) was bonded.

Thereafter, on the other surface of the polypropylene resin layer, a composition formed by adding a silane coupling agent (vinyltriethoxysilane) substituted with a vinyl group as an ethylenically unsaturated group to an ethanol solvent was coated to form an inner layer, thereby preparing a pouch exterior material for a lithium secondary battery.

Thereafter, a lithium secondary battery was manufactured in the same manner as in Example 1.

4. Example 4

A pouch exterior material for a lithium secondary battery and a lithium secondary battery were prepared in the same manner as in Example 3, except that, when preparing the pouch exterior material for a lithium secondary battery, a composition added with a silane coupling agent (3-Methacryloxypropyltrimethoxysilane) substituted with methacryloxy as an ethylenically unsaturated group was coated to form an inner layer.

COMPARATIVE EXAMPLES

1. Comparative Example 1

A pouch exterior material for a lithium secondary battery and a lithium secondary battery were prepared in the same manner as in Example 1, except that the molten polypropylene resin containing vinyl group was not applied on the inner layer.

2. Comparative Example 2

A pouch exterior material for a lithium secondary battery and a lithium secondary battery were prepared in the same manner as in Example 3, except that, when preparing the pouch exterior material for a lithium secondary battery, a composition added with a silane coupling agent in which an ethylenically unsaturated group was not substituted (tetraethoxysilane) instead of a silane coupling agent (vinyltriethoxysilane) substituted with vinyl group as an ethylenically unsaturated group was coated to form an inner layer.

EXPERIMENTAL EXAMPLES

1. Experimental Example 1

Nail Penetration Test

A metal nail having a diameter of 2.5 mm was dropped at a rate of 600 mm/min to each of the fully charged lithium secondary batteries manufactured in Examples and Comparative Examples to perform a safety evaluation test of the lithium secondary batteries by means of a mechanical impact and an internal short circuit.

At this time, an internal short circuit occurred in the lithium secondary battery due to mechanical impact caused by the metal nail, and when heat generated thereby in the battery resulted in ignition, the safety of the secondary battery was determined to be poor.

TABLE 1

|  | Measurement of ignition (number of ignition/total number of experiments) |
| --- | --- |
| Example 1 | 0/5 |
| Example 2 | 0/5 |
| Example 3 | 0/5 |
| Example 4 | 0/5 |
| Comparative Example 1 | 5/5 |
| Comparative Example 2 | 3/5 |

As shown in Table 1, it was confirmed that the lithium secondary battery according to an embodiment of the present invention was not ignited even though the nail penetrated the cell. This is because the adhesion between the pouch exterior material and the gel polymer electrolyte was excellent, so that an internal short circuit in the battery was suppressed, and thus internal heat generation was reduced. Meanwhile, it was confirmed that the lithium secondary batteries according to Comparative Examples did not have adhesion between the gel polymer electrolyte and the pouch exterior material, so that an internal short circuit was not suppressed, and thus, heat generated in the batteries resulted in ignition.

2. Experimental Example 2

High Temperature Exposure Test

In order to confirm the high temperature durability for each of the lithium secondary batteries manufactured in Examples and Comparative Examples, a fully charged lithium secondary battery with 100% of state of charge (SOC) was left for 5 hours at a temperature of 150° C. (temperature increase rate of 5° C./min), and whether there was ignition or not and ignition start time were measured (hot box test). The results are shown in Table 2 below.

TABLE 2

|  | Ignition or no ignition | Ignition start time (min.) |
| --- | --- | --- |
| Example 1 | X | — |
| Example 2 | X | — |

TABLE 2-continued

|  | Ignition or no ignition | Ignition start time (min.) |
| --- | --- | --- |
| Example 3 | X | — |
| Example 4 | X | — |
| Comparative Example 1 | ○ | 11 |
| Comparative Example 2 | ○ | 60 |

The results show that the batteries of Examples were not ignited even when stored at 150° C. However, in the case of Comparative Example 1, the battery was ignited only after 11 minutes after being stored at 150° C., and in the case of Comparative Example 2, the battery was ignited only after 60 minutes after being stored at 150° C.

3. Experimental Example 3

High Temperature Storage Properties Test (Swelling Test)

Each of the lithium secondary batteries of Examples and Comparative Examples was fully charged with 100% of state of charge (SOC) and left for 24 hours at 120° C. to measure the thickness of the lithium secondary battery in order to measure the change in the thickness before and after the lithium secondary battery was left to stand, thereby determining the degree of swelling of the battery. The results are shown in Table 3 below.

TABLE 3

|  | Battery thickness change rate (%) |
| --- | --- |
| Example 1 | 5 |
| Example 2 | 7.5 |
| Example 3 | 5 |
| Example 4 | 7.5 |
| Comparative Example 1 | 25 |
| Comparative Example 2 | 15 |

At a high temperature (120° C.), a large amount of gas is generated in the battery due to the volatilization phenomenon of components in the gel polymer electrolyte and the decomposition reaction of the electrolyte at an electrode interface. As a result, referring to Table 3, in the case of the lithium secondary batteries according to Comparative Examples which have low adhesion between the pouch and the gel polymer electrolyte, it can be seen that the swelling phenomenon of the batteries was noticeable. However, in the case of lithium secondary batteries according to Examples, the adhesion between the pouch and the gel polymer electrolyte was increased, thereby suppressing the swelling phenomenon of the batteries, so that it can be confirmed that the battery thickness change rate was low.

The invention claimed is:

1. A lithium secondary battery comprising:
an electrode assembly;
a gel polymer electrolyte including a polymer network in which an oligomer containing a (meth)acrylate group and an oxyalkylene group has a three-dimensional structure; and
a pouch which holds the electrode assembly and the gel polymer electrolyte,
wherein the pouch includes: an inner layer in which a major surface faces the gel polymer electrolyte; an outer resin layer; and a metal layer between the inner layer and the outer layer,
the inner layer comprises a polymer having an ethylenically unsaturated group or an inorganic oxide coupling agent substituted with an ethylenically unsaturated group,
the ethylenically unsaturated group and the oligomer are coupled, and the ethylenically unsaturated group is at least one selected from the group consisting of a vinyl group, an acryloxy group and a methacryloxy group.

2. The lithium secondary battery of claim 1, wherein the oligomer is represented by Formula 1 below:

$$A\text{-}C_1\text{-}A' \quad \text{[Formula 1]}$$

wherein in Formula 1 above,

A and A' are each independently a unit containing at least one (meth)acrylate group, and $C_1$ is a unit containing an oxyalkylene group.

3. The lithium secondary battery of claim 1, wherein the oligomer comprises at least one compound selected from the group consisting of the compounds represented by Formula 1-1 to Formula 1-5 below:

[Formula 1-1]

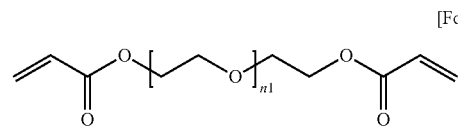

wherein in Formula 1-1 above, n1 is an integer of 1 to 20,000,

[Formula 1-2]

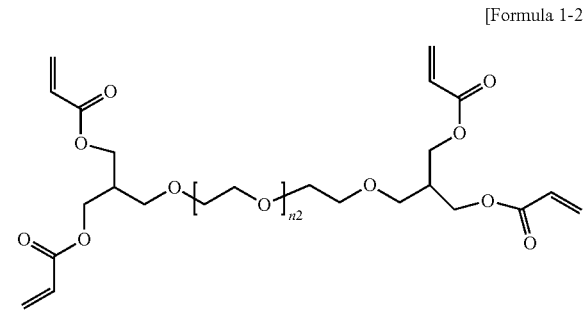

wherein in Formula 1-2 above, n2 is an integer of 1 to 20,000,

[Formula 1-3]

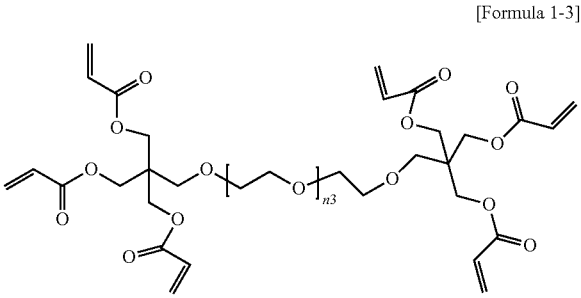

wherein in Formula 1-3 above, n3 is an integer of 1 to 20,000,

[Formula 1-4]

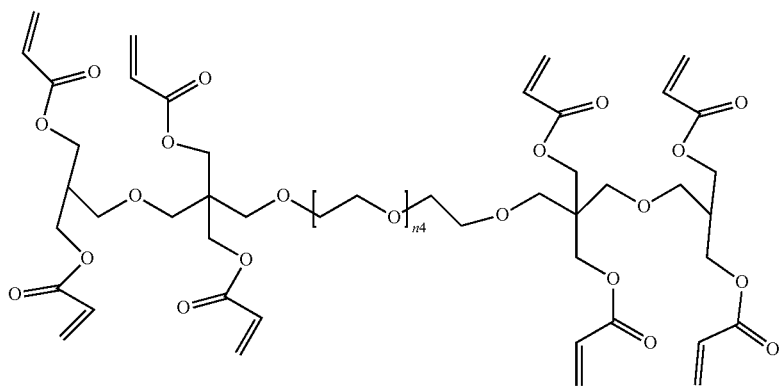

wherein in Formula 1-4 above, n4 is an integer of 1 to 20,000,

[Formula 1-5]

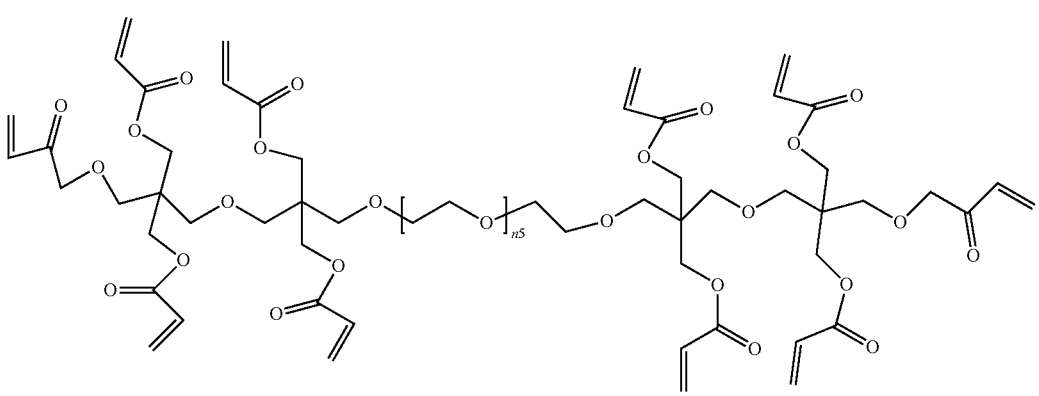

wherein in Formula 1-5 above, n5 is an integer of 1 to 20,000.

4. The lithium secondary battery of claim 1, wherein the oligomer is represented by Formula 2 below:

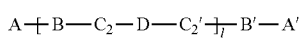

[Formula 2]

wherein in Formula 2 above,

A and A' are each independently a unit containing at least one (meth)acrylate group, B and B' are each independently a unit containing an amide group, $C_2$ and $C_2'$ are each independently a unit containing an oxyalkylene group, D is a unit containing a siloxane group, and l is an integer of 1 to 200.

5. The lithium secondary battery of claim 1, wherein the oligomer comprises at least one compound selected from the compounds represented by Formula 2-1 to Formula 2-5 below:

[Formula 2-1]

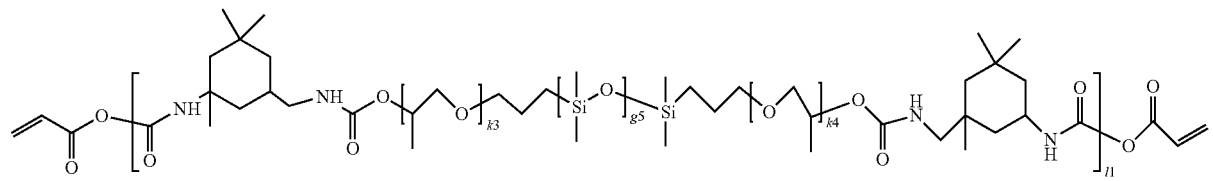

wherein in Formula 2-1 above, k3 and k4 are each independently an integer of 1 to 30, g5 is an integer of 1 to 400, and l1 is an integer of 1 to 200,

[Formula 2-2]

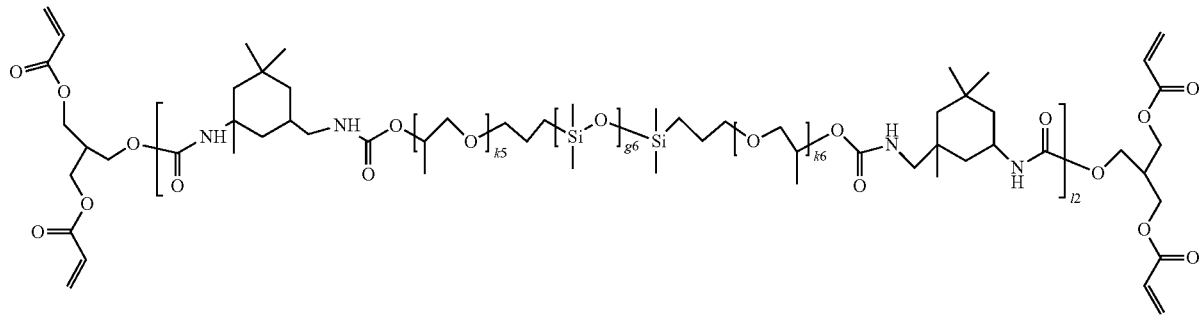

wherein in Formula 2-2 above, k5 and k6 are each independently an integer of 1 to 30, g6 is an integer of 1 to 400, and l2 is an integer of 1 to 200,

[Formula 2-3]

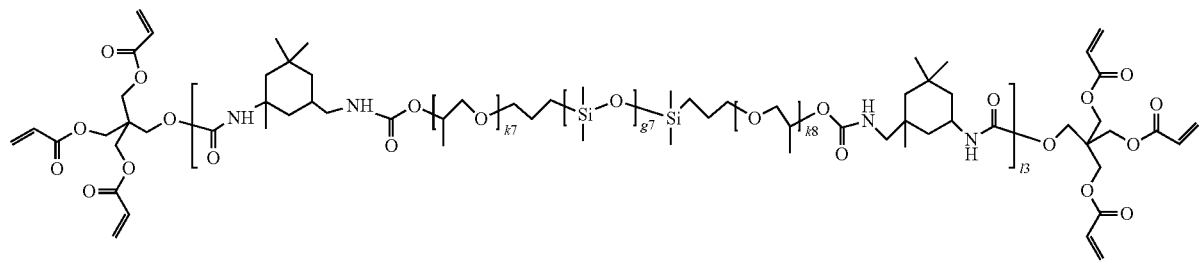

wherein in Formula 2-3 above, k7 and k8 are each independently an integer of 1 to 30, g7 is an integer of 1 to 400, and l3 is an integer of 1 to 200,

[Formula 2-4]

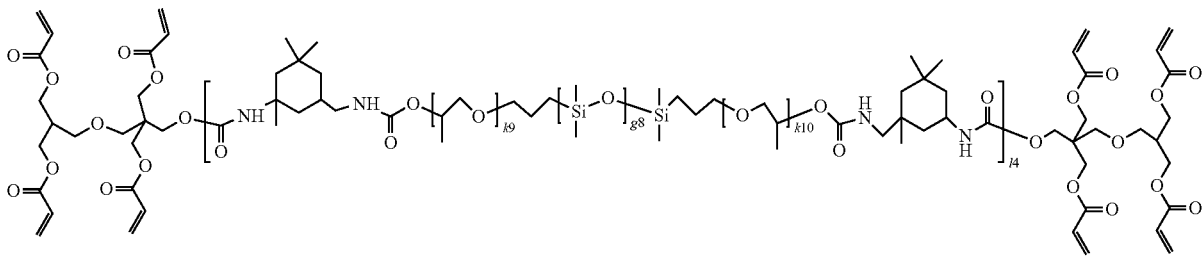

wherein in Formula 2-4 above, k9 and k10 are each independently an integer of 1 to 30, g8 is an integer of 1 to 400, and l4 is an integer of 1 to 200,

[Formula 2-5]

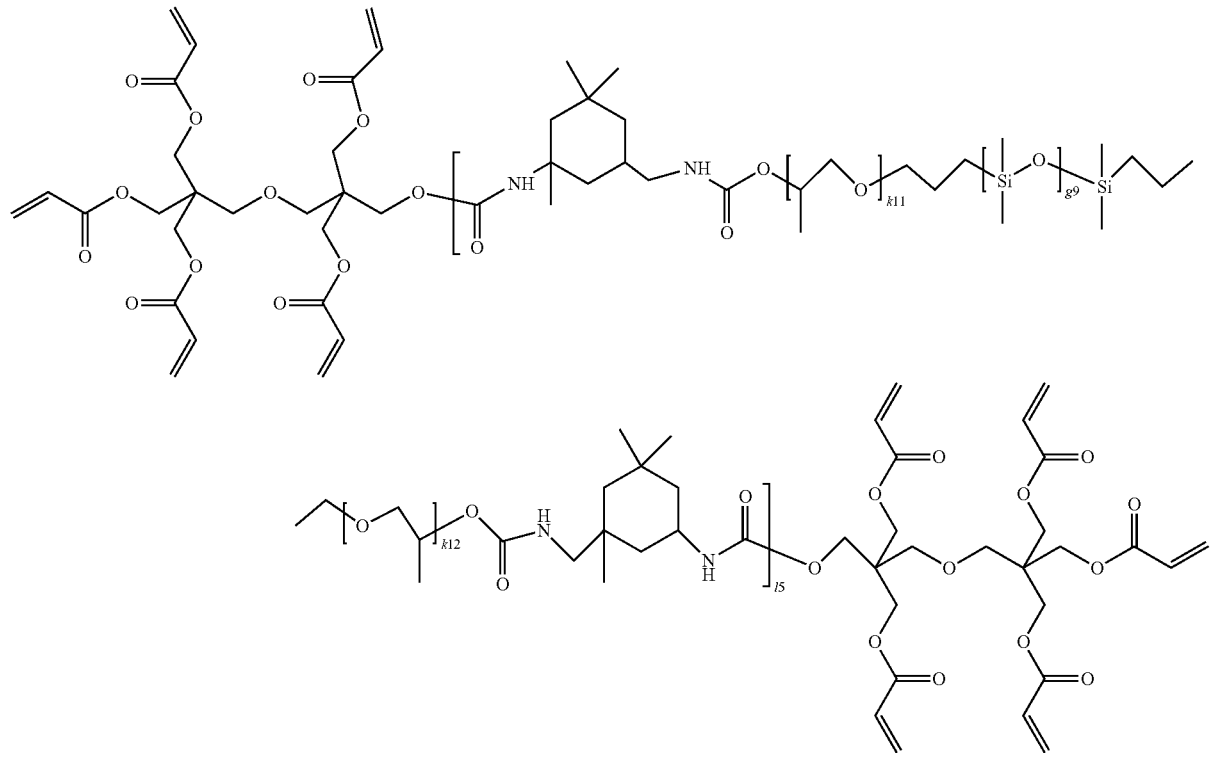

wherein in Formula 2-5 above, k11 and k12 are each independently an integer of 1 to 30, g9 is an integer of 1 to 400, and l5 is an integer of 1 to 200.

6. The lithium secondary battery of claim 1, wherein the gel polymer electrolyte is formed by injecting a gel polymer electrolyte composition including the oligomer into the pouch and then curing the composition.

7. The lithium secondary battery of claim 1, wherein
the polymer having the ethylenically unsaturated group has a main chain and a side chain,
the main chain of the polymer is selected from the group consisting of a polypropylene-butylene-ethylene terpolymer, polypropylene, polyethylene, ethylene propylene copolymer, a copolymer of polyethylene and acrylic acid and a copolymer of polypropylene and acrylic acid, and
the side chain comprises the ethylenically unsaturated group.

8. The lithium secondary battery of claim 1, wherein
the inner layer of the pouch comprises a first layer and a second layer disposed on the first layer,
the first layer comprises a first polymer,
the second layer comprises the polymer having the ethylenically unsaturated group, and
the polymer having the ethylenically unsaturated group is an inorganic oxide coupling agent substituted with the ethylenically unsaturated group.

9. The lithium secondary battery of claim 8, wherein the inorganic oxide coupling agent substituted with the ethylenically unsaturated group comprises an inorganic oxide selected from the group consisting of Si, Al, Ti, Zr, Sn, Ce, Mg, Ca, Zn, Y, Pb, Ba, Hf, and Sr.

10. The lithium secondary battery of claim 8, wherein the inorganic oxide coupling agent substituted with the ethylenically unsaturated group comprises an alkoxysilane compound substituted with an ethylenically unsaturated group, 3-methacryloxypropyltrimethoxysilane, or vinyltriethoxysilane.

11. The lithium secondary battery of claim 8, wherein a thickness of the second layer is 0.01 μm to 10 μm.

12. The lithium secondary battery of claim 1, wherein a thickness of the inner layer is 0.1 μm to 100 μm.

13. The lithium secondary battery of claim 1, wherein the outer layer comprises one selected from the group consisting of polyethylene resin, a polypropylene resin, a polyethylene terephthalate resin, nylon, a low-density polyethylene (LDPE) resin, a high-density polyethylene (HDPE) resin, and a linear low-density polyethylene (LLDPE) resin.

14. The lithium secondary battery of claim 1, wherein the metal layer includes one selected from the group consisting of an alloy of iron (Fe), carbon (C), chromium (Cr) and manganese (Mn), an alloy of iron (Fe), carbon (C), chromium (Cr) and nickel (Ni), and aluminum (Al).

15. The lithium secondary battery of claim 1, wherein a battery thickness change rate is 5 to 7.5%.

16. The lithium secondary battery of claim 1, wherein the inner layer comprises the polymer having an ethylenically unsaturated group.

17. The lithium secondary battery of claim 1, wherein the inner layer comprises the inorganic oxide coupling agent substituted with an ethylenically unsaturated group.

* * * * *